United States Patent [19]
Eakin

[11] Patent Number: 5,775,988
[45] Date of Patent: Jul. 7, 1998

[54] METHOD AND MEANS FOR IMPROVED SIDEWALL VENTILATION

[75] Inventor: George R. Eakin. Osborne. Kans.

[73] Assignee: Osborne Industries, Inc.. Osborne. Kans.

[21] Appl. No.: 751,954

[22] Filed: Nov. 18, 1996

Related U.S. Application Data

[63] Continuation of Ser. No. 464,301, Jun. 5, 1995, abandoned.

[51] Int. Cl.[6] .................................................. F24F 13/10
[52] U.S. Cl. .................... 454/256; 454/253; 454/259
[58] Field of Search ............................ 454/239, 253, 454/256, 259, 271, 273, 276

[56] References Cited

U.S. PATENT DOCUMENTS

| D. 257,060 | 9/1980 | Mann | D23/4 |
|---|---|---|---|
| 4,498,373 | 2/1985 | Dittmer | 454/253 |
| 4,535,685 | 8/1985 | Reuter . | |
| 4,794,852 | 1/1989 | Ee | 454/271 |
| 5,201,685 | 4/1993 | Raisanen | 454/259 |
| 5,236,391 | 8/1993 | Schaefer | 454/253 |

FOREIGN PATENT DOCUMENTS

| 63/630 | 3/1983 | Finland . | |
|---|---|---|---|
| 21 05 077 | 8/1972 | Germany . | |
| 84/01615 | 4/1984 | WIPO | 454/302 |

OTHER PUBLICATIONS

Brochure on "The Better Air System" with various models pictured. pp. 2–7.
Brochure on Schaefer "Automatic Fresh–Air Hallway Intake" with various models pictured. pp. 11–15.
Brochure on RAYDOT ventilation systems with various models pictured. pp. 3–5.

Primary Examiner—Harold Joyce
Attorney, Agent, or Firm—Zarley, McKee, Thomte, Voorhees & Sease

[57] ABSTRACT

A ventilation inlet includes a housing having two air inlets apertures. a solid wind-deflecting rear wall. and a baffle supported for pivotal movement about a pivot point. A spring or other biasing mechanism is operatively connected to the baffle. Air entering the housing opens the baffle and enters the livestock confinement building. The baffle, positioned responsive to the amount and pressure of air entering the housing, directs the flow of air into the confinement space so as to optimize the speed and direction of the external fresh air entering the confinement space. The design of the ventilation inlet is optimized by calculating the necessary operators required to enable the baffle to properly respond to the incoming air.

6 Claims, 3 Drawing Sheets

METHOD AND MEANS FOR IMPROVED SIDEWALL VENTILATION

This application is a continuation of Ser. No. 08/464,301 filed Jun. 5, 1995, abandoned.

BACKGROUND OF THE INVENTION

This invention relates to a method and means for improving mechanical ventilation for livestock confinement buildings.

A good ventilation system for livestock confinement buildings is essential for the health, well-being, and development of the confined animals. The ventilation system accomplishes the following three tasks: air exchange between the interior of the building and the exterior environment to replenish oxygen and to remove moisture, waste gases, and dust, air circulation within the building to produce an evenly tempered, uniform living environment for the animals, and heating or cooling to maintain the temperature within a chosen optimum range for the animals.

Two alternative types of ventilation systems are generally used to provide ventilation for animals, either natural ventilation systems or mechanical ventilation systems.

Natural ventilation systems rely upon the wind passing through openings, such as windows or continuous openings along the sides of the building, and upon thermal currents created by the natural buoyancy of heated air within the building. Fresh air therefore enters the building and circulates through the confinement space and then exits on the down-wind side of the building and through vents in the ridge or other high point in the roof, removing moisture, waste gases, and dust with the exiting air stream. Although natural ventilation may be less costly to construct and to operate, ventilation reliability is unpredictable because its operation is greatly dependent upon the forces of nature, over which the system generally has only minimum control.

Mechanical ventilation systems use powered exhaust fans to slightly reduce the air pressure within the building and thereby causing fresh air to be drawn into the space to be ventilated while the fans discharge the moisture, gases, and dust from the building. The incoming fresh air is conveyed into the building through specific air inlet locations. The air inlet locations are chosen by one skilled in the art of ventilation according to specific engineering practice so that these locations cooperate in developing good fresh air distribution throughout the building.

The air inlet locations are generally equipped with devices called air inlets that attempt to regulate the volume flow of fresh air, its incoming speed, and its direction into the building. The air inlet regulates the volume flow of the fresh air to balance the fresh air requirement of the animals with the need to conserve or expel heat from within the building and to proportionately match the variable exhaust capacity of the exhaust fans. The air inlet controls the speed of the incoming air to regulate the distance that the air stream penetrates into the ventilated space and the circulation pattern that results within that space. The air inlet also directs the incoming air into the building. In the wintertime the goal is to maximize mixing time for the incoming cold air with the warm interior air and therefore avoid stressful drafts. In summertime the goal is to optimize the cooling effect of the incoming fresh air on the animals.

Mechanical ventilation systems use a wide variety of means and methods for air inlets including both automatic self-regulating air inlets that respond only to the slight vacuum created by the exhaust fans and also manually set and power-driven air inlets with regulation devices which sense the operation of the exhaust fans or the vacuum that they create. Automatic self-regulating air inlets are generally preferred over manually set air inlets because the latter require continuous supervision labor and are preferred over power-driven air inlets because the latter are more costly complicated, and less reliable in operation.

Automatic self-regulating air inlets may be designed specifically for use in the ceiling, on the sidewall, or with slots in the juncture between the ceiling and sidewall of the building.

The proper operation of automatic air inlets is generally effected by wind pressure against the part exposed to the exterior environment. This wind pressure, by its very nature, is variable and unpredictable. Its effect on the performance of air inlets and, by extension, the ventilation system can be seriously detrimental to achieving the goals of the ventilation system.

This invention relates to specific methods and means that define the design and construction of an improved automatic self-regulating air inlet device which minimizes the effect of wind pressure on air inlet performance and which in the preferred embodiment shown here mounts to the sidewall of confinement buildings, but could also mount with minor appropriate changes to other transitions between the exterior and interior of the confinement space.

SUMMARY OF THE INVENTION

Therefore, a primary objective of the present invention is the provision of an improved method and means for ventilating a livestock confinement building.

A further objective of the present invention is the provision of an improved method and means for ventilation which accurately and proportionately controls the volume of the incoming air stream.

A further objective of the present invention is the provision of an improved method and means for ventilation which accurately controls the speed of the incoming air stream to maximize its mixing and tempering with warmer interior air when the incoming air stream is cold in winter, to optimize its cooling effect in summertime, and to provide a smooth automatic transition between these two operating extremes.

A further objective of the present invention is the provision of an improved method and means for ventilation which accurately controls the direction of the incoming air stream so that the direction is generally upwards and along the ceiling when the volume of incoming air is reduced in wintertime to promote mixing and tempering of the colder incoming air with the warmer air higher in the room and is generally horizontal and downwards toward the animals when the volume of incoming air is increased in summertime to promote cooling of the animals by more immediate contact.

A further objective of the present invention is the provision of an improved method and means for ventilation which minimizes the effect on air inlet performance of exterior wind pressure on the air inlet.

A further objective of the present invention is the provision of an improved method and means for ventilation which is totally automatic in operation without the need for manual or power-assisted supervision or adjustment.

A still further objective of the present invention is the provision of an improved method and means for ventilation of a livestock confinement building in order to provide optimum air distribution which minimizes stagnate air

3 spaces and localized drafts while providing optimum air exchange within the confinement living space.

Another objective of the present invention is the provision of an improved method and means for ventilation within a livestock confinement building which is economical, efficient in use, automatic in operation, and which results in a desirable and durable assembly.

The preferred embodiment of the present invention utilizes a sidewall inlet having an inlet top wall, an inlet bottom wall, two inlet sidewalls, and an exterior inlet back wall. Mounted within the inlet housing is a baffle. This baffle is pivotally hinged and can move between a first closed position wherein no air is allowed to enter the livestock confinement space and to a second open position wherein air flows into the livestock confinement space. An upper inlet aperture and a lower inlet aperture are formed on the inlet housing to draw in the requisite air used to ventilate the livestock confinement space.

Further, a spring or other biasing means is connected at one end to the baffle and at the other end to the inlet housing. The spring or biasing means exerts a force on the baffle which tends to hold the baffle in a closed position until air pressure on the exterior side of the baffle is sufficient to move the baffle to its second, or open, position.

Due to the baffle's positioning adjacent the outlet area of the inlet housing, the baffle also acts as a directional member forcing incoming air into an upward flow direction. Due to the invention's unique construction, when the volumetric air flow rate is great, the baffle imparts a more limited influence on the direction of the air flow. However, when the air flow is less than maximum, the baffle will tend to force the air flow direction higher in the confinement space so as to compensate for its lower volumetric air flow rate in order to project the fresh air further into the confinement space and into the air mass above the animals that contains the highest heat and moisture content.

Further, as the volumetric air flow decreases, the baffle moves closer to its closed position, thereby decreasing the size of the air outlet. As the size of the air outlet decreases, the volumetric flow rate of the fresh air into the confinement space decreases proportionately, while maintaining the linear air flow velocity to ensure that the penetration of the fresh air into the confinement space and the resultant ventilation is maximized within the building.

DETAILED DESCRIPTION OF THE PREFERRED EMBODIMENT

Figure 1:
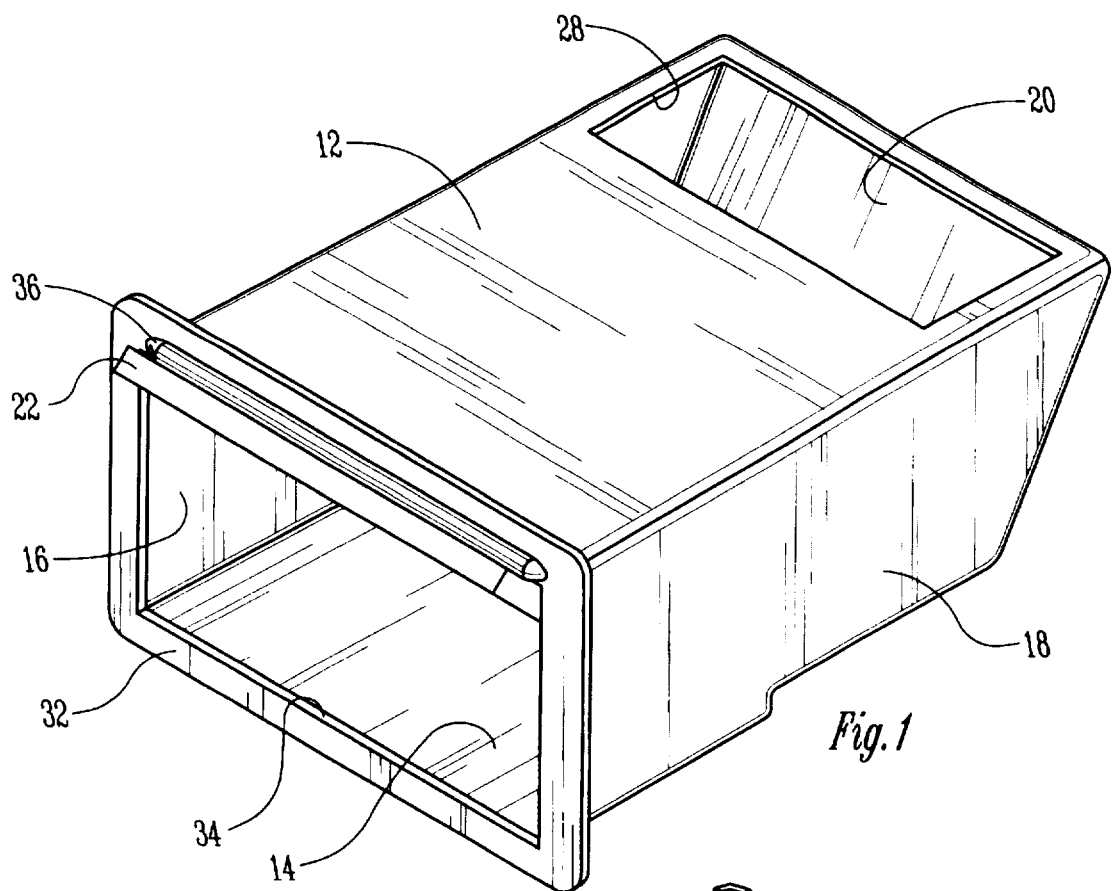
FIG. 1 is a perspective view of a sidewall ventilation inlet.
Figure 2:
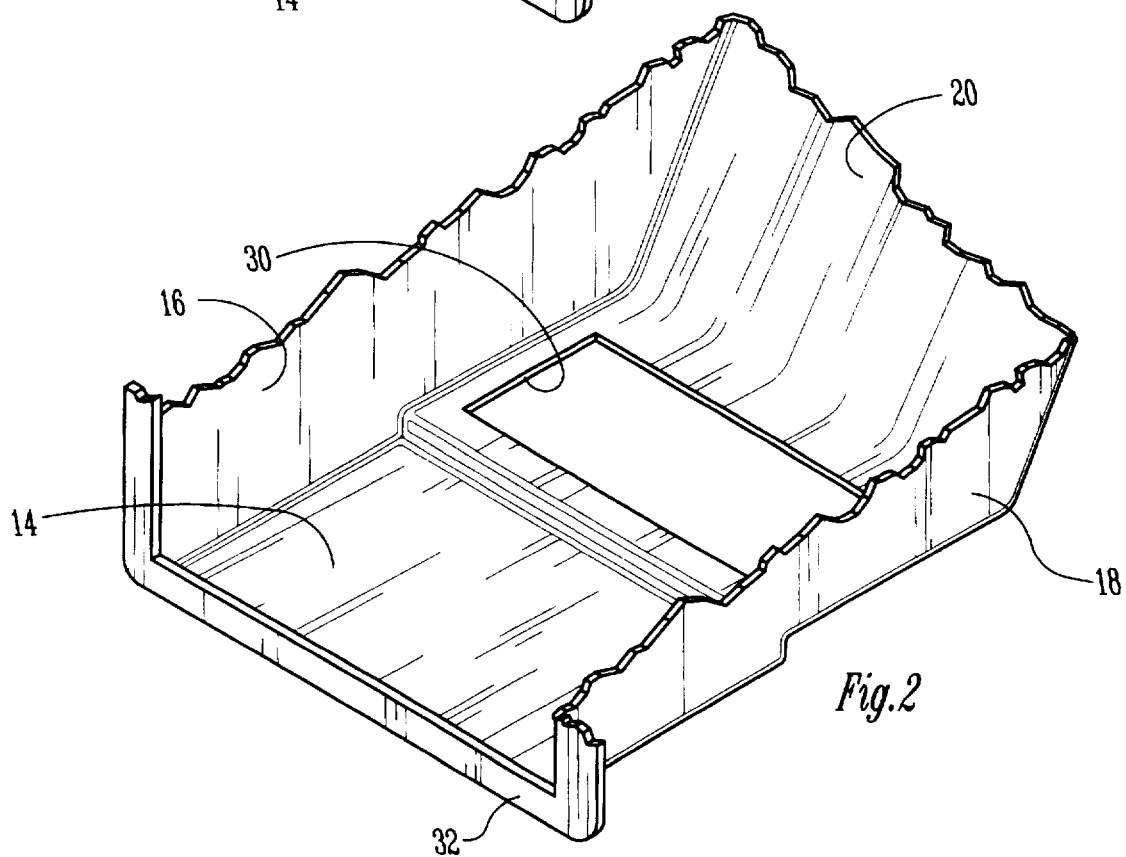
FIG. 2 is a perspective cutaway view of FIG. 1.
Figure 3:
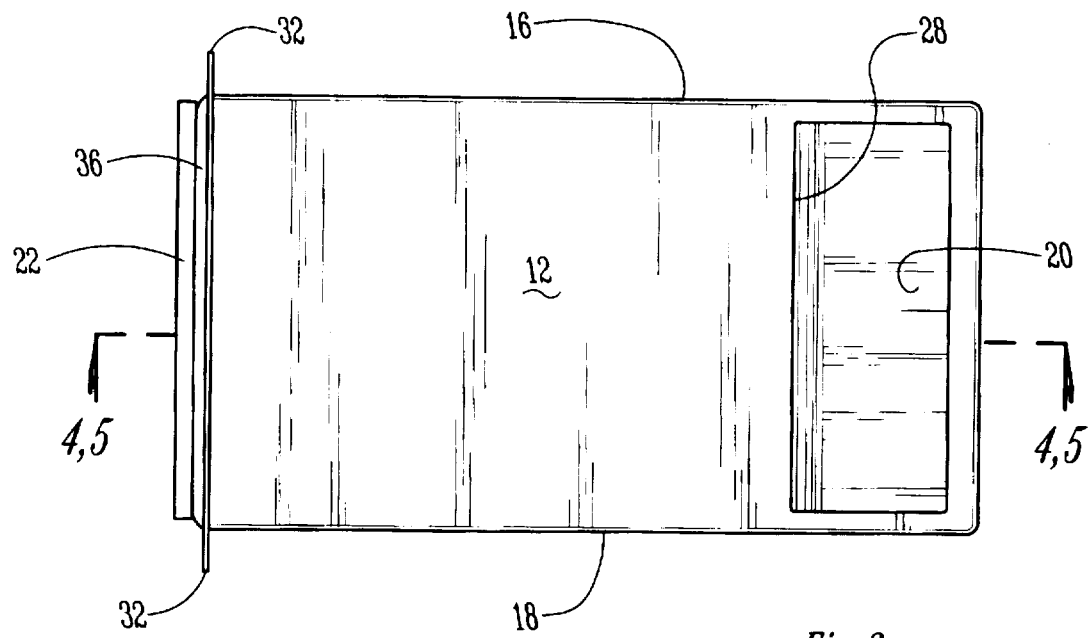
FIG. 3 is an overhead plan view of a sidewall ventilation inlet.

Referring to the drawings of the preferred sidewall embodiment of the present invention, numeral 10 generally refers to a sidewall design of ventilation inlet which comprises a top wall 12, a bottom wall 14, opposite side walls 16, 18 and a rear wall 20. Together these walls 12, 14, 16, 18, 20, form the inlet housing. Inlet 10 also comprises a baffle 22. Baffle 22 is supported for pivotal movement about pivot point 24. Spring 26 is connected at one end to top wall 12 and at another end to baffle 22.

Inlet 10 has two apertures which allows air into the housing. Upper aperture 28 is positioned in the rear-most portion of top wall 12. Lower aperture 30 is positioned in the rear-most portion of bottom wall 14. As shown best in FIGS. 4 and 5, bottom wall 14 is shorter in length than top wall 12 so that rear wall 20 is substantially planar and non-vertical in orientation in the preferred embodiment of the invention, however the rear wall 20 may also be planar and vertical or non-planar and semi-oval in alternative configurations. Rear wall 20 cooperates with apertures 28 and 30 and shields the air stream entering via apertures 28 and 30 from wind pressure directed toward the sidewall of the building in which the air inlet is installed.

Figure 4:
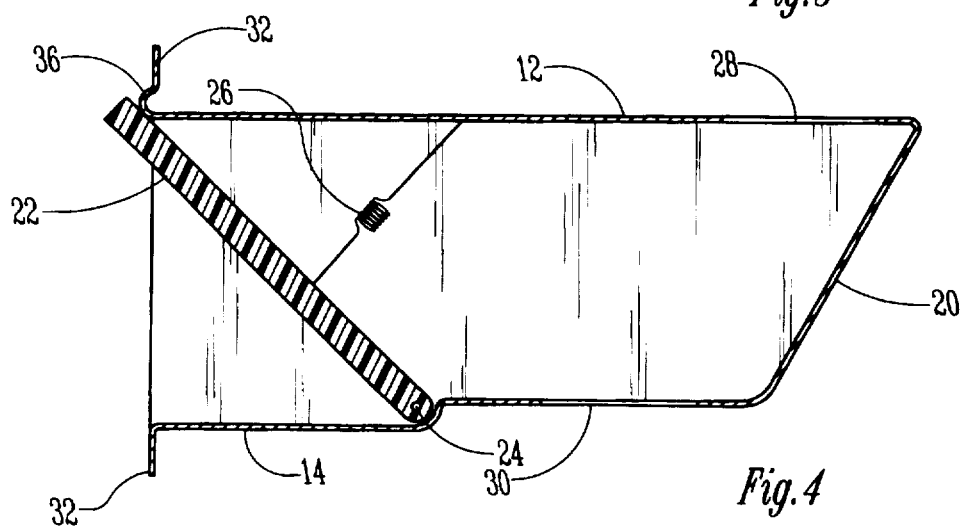
FIG. 4 is a sectional view taken along line 4—4 of FIG. 3 with the baffle in a closed position.
Figure 5:
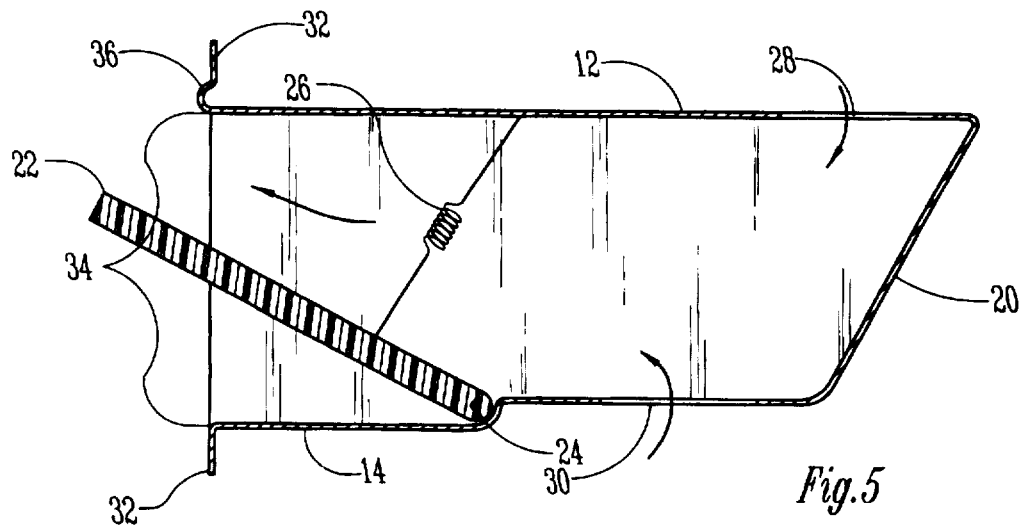
FIG. 5 is a sectional view taken along line 5—5 of FIG. 3 with the baffle shown in an open position.

Once air has entered into inlet 10 through upper and lower apertures 28 and 30, the air pressure difference between the interior of the building and the external environment produces an unbalanced force on baffle 22 which opens to allow air to enter the confinement space. As best shown in FIG. 5, the more air that enters the upper and lower apertures 28, 30, the more pressure is placed on baffle 22 and the resulting opening into the confinement space will increase in size. Baffle 22 extends into the confinement space as the opening increases. The movement of baffle 22 is proportionately resisted by biasing means 26 which extends until the biasing force exactly balances the force created by the pressure difference. A flange 32 extends from the inlet opening 34 and is constructed to both strengthen inlet 10 and to hold inlet 10 in place in the wall of a confinement building. Finally, lip 36 protrudes inwardly from flange 32 adjacent the top wall 12 so as to provide a transition between top wall 12 and flange 32 which is both an adequate seal when baffle 22 is in its closed position, as shown in FIG. 4, and more importantly, provides a smooth directing surface that cooperates with the air pressure to create a laminar, non-turbulent air flow outward through the inlet opening 34 between baffle 22 and lip 36.

In operation, this unique structure will utilize the difference in air pressure on one side of baffle 22 to open baffle 22 and inject fresh air into the confinement space. As best shown in FIGS. 4 and 5, exterior air is drawn into the housing through upper and lower apertures 28, 30. Prior to this influx of exterior air, baffle 22 remained in its closed position as shown in FIG. 4. After the exterior air has been drawn into the housing, the resultant air pressure forces baffle 22 to rotate about pivot point 24, thereby opening the baffle and allowing the exterior air to enter into the confinement space. Spring 26 or other biasing means is constantly counterbalancing the force created by the air pressure inside the housing and exerting an equilivent force on baffle 22 in a direction which causes baffle 22 to rotate about pivot point 24 towards its closed position.

The resulting interaction between the air pressure force and the biasing means 26 of inlet 10 creates two specific advantages. First, if the air pressure difference between the interior and exterior of the building is extremely high, the baffle will open to a position wherein the incoming external air will enter the confinement space having a direction of travel in a substantially horizontal path. Because the air pressure difference is great and the resulting volumetric air flow is high, the air can enter the confinement space traveling in a substantially horizontal path and penetrate a great distance into the confinement space. However, when the air pressure difference is only moderately high, the volumetric air flow rate will be proportionately lower. Due to the presence of the biasing means 26, baffle 22 will be inclined so as to direct the flow of air upward into the confinement space, thereby allowing the flow of air greater penetration into the confinement space and greatly extending the time for mixing and tempering of the air stream. This extended mixing time prevents a chilling effect on the animals that can occur in the absence of such mixing and tempering because the greater density of cold exterior air compared to the warm interior air causes the incoming air stream to drop to floor level unless properly managed by the automatic operation of the air inlet.

Second, because baffle 22 moves toward its closed position when the air pressure within the housing is only moderately high, the size of the air outlet between baffle 22 and lip 36 decreases proportionately thereby maintaining a nearly constant linear air flow rate as the volumetric rate decreases. By decreasing the size of the outlet, the linear air flow speed into the confinement space is maintained thereby preserving the penetration of exterior fresh air into the confinement space as the volumetric rate of flow decreases. These adjustments are made automatically as a result of the unique manipulation and calculation of the parameters discussed below.

These advantages are achieved without manual adjustments, as in the prior art. In the prior art, for example, manual adjustment had to be constantly made depending on temperature, air pressure, season, and the like. The present invention allows for automatic adjustment to the continuously changing operating parameters.

In order to assure the proper performance of the improved ventilation air inlet, certain design specifications must be met and these specifications are part of the present invention. It is well known by those skilled in the art of animal ventilation science that, when the air flow exiting an air inlet (e.g. air inlet 10) into the livestock confinement building is maintained at a constant speed of approximately 1000 feet per minute (fpm) and its direction is properly chosen for the temperature and seasonal requirements of the animals, the air inside the confinement unit will be thoroughly mixed and unnecessary drafts and stagnate air spaces will be eliminated. Using the dimensions illustrated in FIG. 6, the design equations of the present invention, set forth below, can and must be utilized to produce an automatic air inlet with satisfactory performance while maintaining a constant air flow speed, and, furthermore, provide a unique design specification by which the air inlet performance can be maximized. Such an air inlet may be designed for any transition from exterior to the interior of the confinement space, and in the preferred embodiment shown in the present invention, a sidewall transition is shown, but the invention is not limited to this configuration.

Alternative to the optimum design specification for the wall inlet 10, limiting satisfactory design specifications for values of air flow speed which are greater than or less than the 1000 fpm optimum speed are also taught by the equations of the present invention and, by defining conditions for values of parameters calculated from dimensional measurements of alternative geometries of wall inlet 10 using these equations, this invention distinguishes between geometrical configurations which produce acceptable performance and those that produce unacceptable performance for the wall inlet 10 and between acceptable and unacceptable values for the performance characteristics of the biasing means 26. Similar equations and limiting conditions also apply for alternative transitions with minor redefinition of geometrical parameters so the invention is not limited to the wall inlet transition but can be generally applied to other geometries and transitions.

Table 1 defines the parameters shown in the equations necessary to maximize the performance of the wall inlet.

TABLE 1

| PARAMETERS | DEFINITION |
|---|---|
| $W_b$ | Baffle Weight (in pounds) |
| $L_b$ | Baffle Length |
| $W_b$ | Baffle Width |
| b | Baffle Pivot Horizontal Distance to Intersection of baffle Centerline and Housing |
| f | Baffle Pivot Vertical Distance to Intersection of Baffle Centerline and Housing |
| h | Inlet Throat Height Vertical to Baffle Pivot |
| r | Baffle Anchor Distance Parallel to Baffle Centerline |
| c | Baffle Anchor Distance Perpendicular to Baffle Centerline |
| a | Housing Anchor Distance Horizontal from Baffle Pivot |
| e | Housing Anchor Distance Vertical to Baffle Pivot |

(All measurements are in inches unless otherwise noted.)

Table 2 sets forth the range of acceptable operating values for air flow speeds, $V_{min}$ and $V_{max}$, where $V_{max}$ is greater than $V_{min}$ for all design values chosen for $V_{min}$ and $V_{max}$. Therefore, for example, a user selecting a minimum velocity $V_{min}$ of 200 in/s in an optimum static pressure range must select a $V_{max}$ in the range of 201 to 290 in/s. These ranges of air flow speeds correspond to operational ranges of static pressure difference between the exterior and interior of the livestock confinement building. The static pressure range for acceptable performance levels are indicated. The operational performance of the preferred embodiment of the present invention is optimized in a properly engineered ventilation system by using the design equations taught by this invention for the automatic wall inlet.

TABLE 2

| INLET PERFORMANCE | $V_{min}$ RANGE | $V_{max}$ RANGE | STATIC PRESSURE RANGE (inches of water) |
|---|---|---|---|
| Acceptable; low static pressure range | 100–170 in/s | 100–170 in/s | 0.01–0.04 |
| Acceptable; high static pressure range | 290–320 in/s | 290–320 in/s | 0.13–0.16 |
| Optimum; normal static pressure range | 170–290 in/s | 170–290 in/s | 0.04–0.13 |

In order to optimize the automatic performance of the wall inlet, a user must perform the following mathematical operations. First, the air density must be defined. Air density is shown in the equations as the symbol $\rho_a$. Air density is represented in pounds-force second squared per inch raised to the fourth power, $lb_f s^2/in^4$.

The second step is to define the variable $r_2$. $r_2$ is defined using the following equation:

$$r_2 = \sqrt{r^2 + c^2}$$

The value of $r_2$ is defined in inches.

Next, the value of $h_2$ must be defined. The value of $h_2$ is defined by the following equation:

$$h_2 = (h - e)$$

The value of $h_2$ is in inches.

Next, the angle $\theta_1$ must be defined. $\theta_1$ is defined using the following formula:

$$\theta_1 = TAN^{-1}\left[\frac{f}{b}\right]$$

The angle $\theta_1$ is represented in degrees.

Next, the angle $\theta_2$ must be defined. $\theta_2$ is defined using the following formula:

$$\theta_2 = TAN^{-1}\left[\frac{f}{b}\right] - SIN^{-1}\left[\frac{h}{2(f^2 + b^2)^{1/2}}\right]$$

The angle $\phi_1$ is represented in degrees.

Next, the angle $\phi_1$ must be defined. $\phi_1$ is defined using the following formula:

$$\phi_1 = TAN^{-1}\left[\frac{h_2 - r_2 SIN(\theta_1 + \beta)}{a + r_2 COS(\theta_1 + \beta)}\right]$$

The angle $\phi_2$ is represented in degrees.

Next the angle $\phi_2$ is defined by the following formula:

$$\phi_2 = TAN^{-1}\left[\frac{h_2 - r_2 SIN(\theta_2 + \beta)}{a + r_2 COS(\theta_2 + \beta)}\right]$$

The angle $\phi_2$ is defined by degrees.

The angle $\beta$ is defined by the following formula:

$$\beta = TAN^{-1}\left[\frac{c}{r}\right]$$

The angle $\beta$ is represented in degrees.

The next step is to define the geometrically determined constant $C_1$. $C_1$ is determined by the following equation:

$$C_1 = \frac{1}{2} W_b L_b COS(\theta_1) + \frac{1}{4} \rho_a w_b L_b^2 V_{min}^2$$

$C_1$ is represented in lb/in.

The next step is to define the geometrically determined constant $C_2$. $C_2$ is determined by the following equation:

$$C_2 = \frac{1}{2} W_b L_b COS(\theta_2) + \frac{1}{4} \rho_a w_b L_b^2 \left(\frac{V_{max}}{2}\right)^2$$

$C_2$ is represented in lb/in.

The next step is to determine the geometrically determined constant F. To determine F, the following equation must be applied:

$$F = \frac{C_1}{r_2 SIN(\theta_1 + \beta + \phi_1)}$$

The units of measurement for F are in $lb_f$.

The next step is to determine the geometrically determined constant $L_1$. To determine $L_1$, the following equation must be applied:

$$L_1 = \sqrt{|h_2 - r_2 SIN(\theta_1 + \beta)|^2 + |a + r_2 COS(\theta_1 + \beta)|^2}$$

$L_1$ is represented in inches.

Lastly, the geometrically determined constant $L_2$ is determined using the following equation:

$$L_2 = \sqrt{|h_2 - r_2 SIN(\theta_2 + \beta)|^2 + |a + r_2 COS(\theta_2 + \beta)|^2}$$

$L_2$ is represented in inches.

Figure 6:
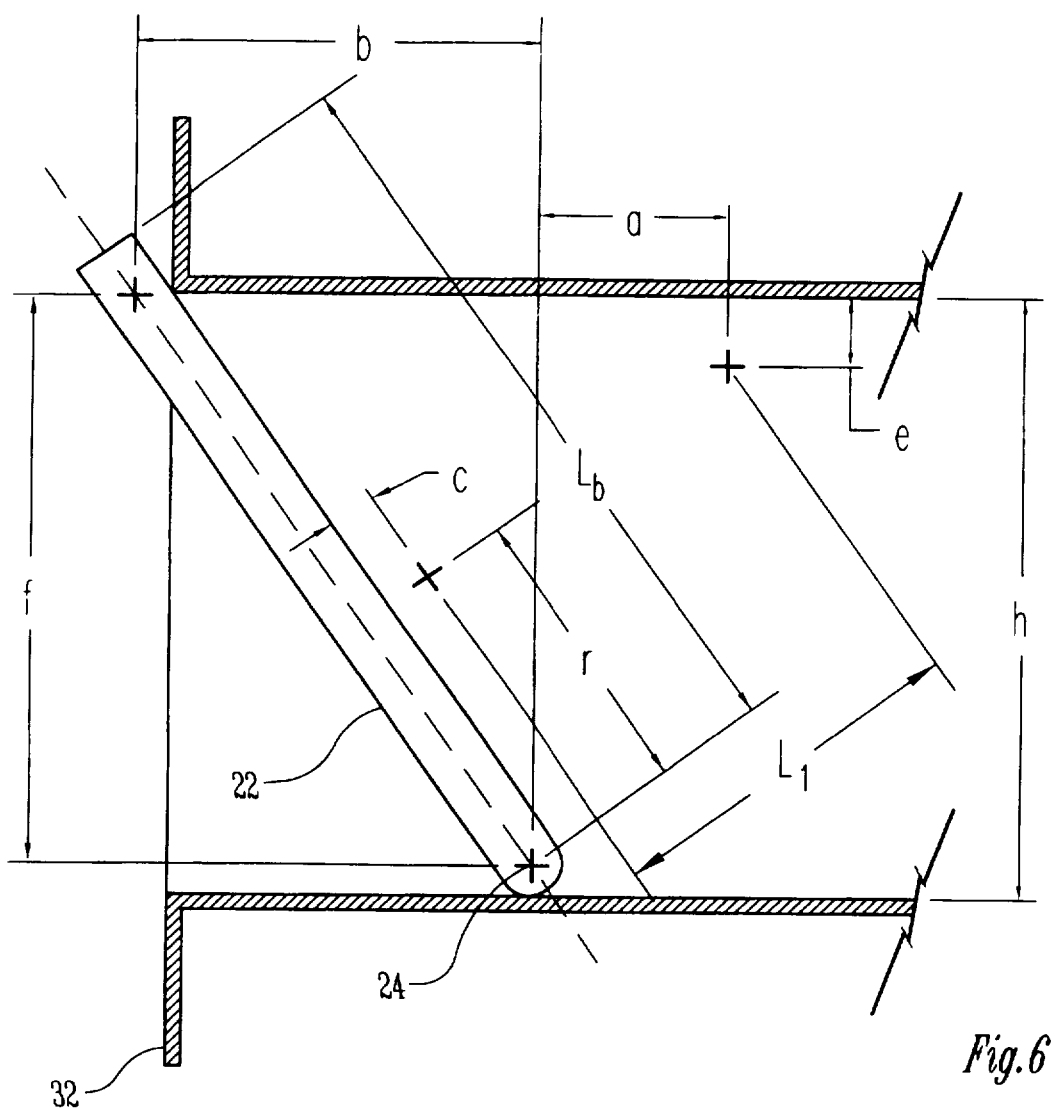
FIG. 6 is a sectional view showing relative dimensions used in describing the present invention.
Figure 7:
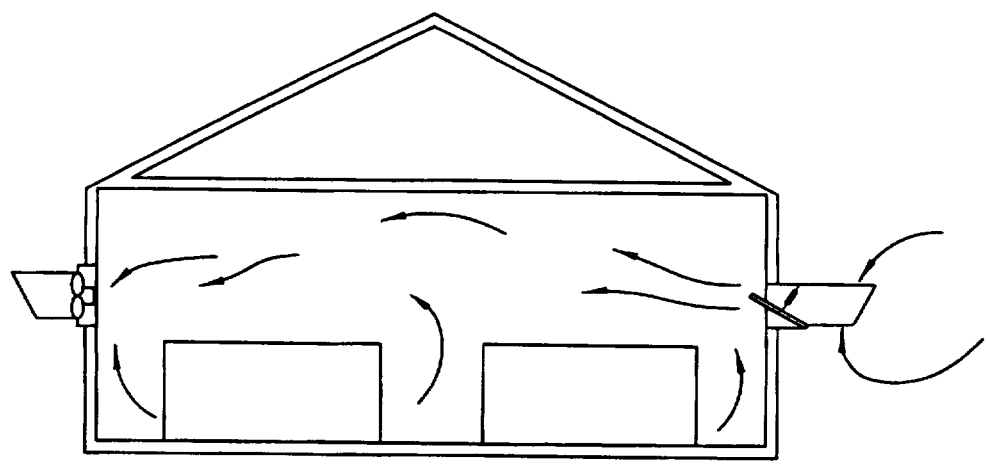
FIG. 7 is a sectional view showing an overall ventilation system and its effect in a livestock confinement building.

After each of these geometrically determined constants has been calculated for a proposed geometry as defined by FIG. 6, the design specification for the air inlet is established by calculating the initial length, $L_0$, of the optimum mechanical biasing means 26 (or spring 26 in its preferred embodiment in the present invention) and the required value of K, the constant of proportionality between the applied pressure force and the extension of the biasing means 26 in units of force per unit of extension. These two values are necessary for optimum inlet performance within the usable and acceptable operating range established by limiting values of air flow speed set forth in Table 2.

$L_0$ is defined by the following equation:

$$L_0 = \frac{L_1 - \left[\frac{C_1 SIN(\theta_2 + \beta + \phi_2)}{C_2 SIN(\theta_1 + \beta + \phi_1)}\right] L_2}{1 - \left[\frac{C_1 SIN(\theta_2 + \beta + \phi_2)}{C_2 SIN(\theta_1 + \beta + \phi_1)}\right]}$$

$L_0$ is measured in inches.

In addition, the required force constant, K, is determined by the following equation:

$$K = \frac{F}{L_1 - L_0}$$

K is in lbs/in.

If the value of $L_0$ is less than zero, then the design equations of the present invention show that no unique biasing means 26 exists that optimizes the automatic performance of the wall inlet with the geometry specified and for values shown in Table 2.

Further, if the value of $L_0$ is greater than the value of $L_1$, then no unique biasing means 26 exists for the geometry specified and for values shown in Table 2.

However, if the value of $L_0$ is greater than zero and less than the value calculated for $L_1$, then the biasing means with values of $L_0$ and K for the specified geometry and for values shown in Table 2 will produce a wall inlet design that will provide the best performance available for that structure.

In the preferred embodiment, the walls 12, 14, 16, 18 and baffle 22 may be constructed of a variety of materials. For example, the entire structure can be manufactured from wood, insulated metal, fiberglass-reinforced plastic, or from a variety of alternative plastic materials. The materials of the present invention can be varied without detracting from the spirit or the intent thereof. The inlet of the present invention is designed and constructed with suitable hardware accessories so that it can be quickly and easily installed into a livestock confinement building.

In the drawings and specification, there has been set forth a preferred embodiment of the invention, and although

9 specific terms are employed, they are used in a generic and descriptive sense only and not for purposes of limitation. Changes in the form and the proportional parts as well as in the substitution of equivalents are contemplated as circumstances may suggest or render expedient without departing from the spirit or scope of the invention, as further defined in the following claims.

I claim:

1. A livestock ventilator inlet for improving air flow into a livestock confinement building, comprising:
   a housing having an air inlet and an air outlet;
   a baffle located adjacent the air outlet supported for pivotal movement between a closed position and an open position;
   biasing means operatively connected to the baffle having a sufficient spring constant and positioned such that the air flow exiting the air outlet has a velocity which is automatically maintained substantially in the range of 100 inches per second to 320 inches per second.

2. The livestock ventilation inlet of claim 1 wherein the housing includes a means for deflecting direct wind gusts.

3. The livestock ventilation inlet of claim 2 wherein the inlet comprises an upper opening and a lower opening.

4. A livestock ventilation inlet for improved air flow into a livestock confinement building having a housing with an air inlet and an air outlet, a baffle located adjacent the air outlet supported for pivotal movement between a closed position and an open position, and biasing means operatively connected to the baffle, the biasing means having an initial length, $L_0$, and a spring constant, $K$, and $F$ and $L_1$ are geometrically determined constants for force and distance, such that in the equation:

$$K = \frac{F}{L_1 - L_0}$$

the value $L_0$ is greater than 0 and less than the value for $L_1$.

5. A method for optimizing a sidewall inlet having a housing with an air inlet and an air outlet, a baffle located adjacent the air outlet supported for pivotal movement between a closed position and an open position, and biasing means operatively connected to the baffle, the biasing means having an initial length, $L_0$, and a spring constant, $K$, in order to improve air flow within a livestock confinement building comprising the steps of:
   determining air density, $\rho_a$;
   determining weight of the baffle, $W_b$;
   determining baffle lengths, $L_b$;
   determining baffle width, $w_b$;
   determining baffle pivot horizontal distance to intersection of baffle centerline and housing, b;
   determining baffle pivot vertical distance to intersection of baffle centerline and housing, f;
   determining inlet throat height vertical to baffle pivot, h;
   determining baffle anchor distance parallel to baffle centerline, r;
   determining baffle anchor distance perpendicular to baffle centerline, c;
   determining housing anchor distance horizontal from baffle pivot, a;
   determining housing anchor distance vertical to baffle pivot, e;
   selecting a biasing means for attachment to the baffle based on the values determined in previous steps such that air exiting the air outlet will have a velocity automatically be maintained substantially in the range of 100 inches per second to 320 inches per second.

6. The method of claim 5 further comprising the steps of:
   defining variable $r_2$ as $$r_2 = \sqrt{r^2 + c^2}$$

defining variable $h_2$ as $$h_2 = (h - e)$$

defining angle $\theta_1$ as $$\theta_1 = \text{TAN}^{-1}\left[\frac{f}{b}\right]$$

defining angle $\theta_2$ as $$\theta_2 = \text{TAN}^{-1}\left[\frac{f}{b}\right] - \text{SIN}^{-1}\left[\frac{h}{2(f^2 + b^2)^{1/2}}\right]$$

defining angle $\phi_1$ as $$\phi_1 = \text{TAN}^{-1}\left[\frac{h_2 - r_2\text{SIN}(\theta_1 + \beta)}{a + r_2\text{COS}(\theta_1 + \beta)}\right]$$

defining angle $\phi_2$ as $$\phi_2 = \text{TAN}^{-1}\left[\frac{h_2 - r_2\text{SIN}(\theta_2 + \beta)}{a + r_2\text{COS}(\theta_2 + \beta)}\right]$$

defining angle angle $\beta$ as $$\beta = \text{TAN}^{-1}\left[\frac{c}{r}\right]$$

defining value $C_1$ as $$C_1 = \frac{1}{2}W_bL_b\text{COS}(\theta_1) + \frac{1}{4}\rho_a w_b L_b^2 V_{min}^2$$

defining value $C_2$ as $$C_1 = \frac{1}{2}W_bL_b\text{COS}(\theta_1) + \frac{1}{4}\rho_a w_b L_b^2 \left(\frac{V_{max}}{2}\right)^2$$

Defining value F as $$F = \frac{C_1}{r_2\text{SIN}(\theta_1 + \beta + \phi_1)}$$

defining value $L_1$ as $$L_1 = \sqrt{[h_2 - r_2\text{SIN}(\theta_1 + \beta)]^2 + [a + r_2\text{COS}(\theta_1 + \beta)]^2}$$

defining value $L_2$ as $$L_2 = \sqrt{[h_2 - r_2\text{SIN}(\theta_2 + \beta)]^2 + [a + r_2\text{COS}(\theta_2 + \beta)]^2}$$

defining value $L_0$ as $$L_0 = \frac{L_1 - \left[\frac{C_1 \mathrm{SIN}(\theta_2 + \beta + \phi_2)}{C_2 \mathrm{SIN}(\theta_1 + \beta + \phi_1)}\right] L_2}{1 - \left[\frac{C_1 \mathrm{SIN}(\theta_2 + \beta + \phi_2)}{C_2 \mathrm{SIN}(\theta_1 + \beta + \phi_1)}\right]}$$

calculating K as $$K = \frac{F}{L_1 - L_0}$$

wherein each of these steps are undertaken prior to the step of selecting a biasing means, the biasing means having a spring constant, K, and an initial length, $L_0$.

* * * * *